INVENTOR
John E. Avansino

ATTORNEYS

Patented Oct. 27, 1953

2,656,669

UNITED STATES PATENT OFFICE 2,656,669

TREE SHAKING MECHANISM

John E. Avansino, Linden, Calif.

Application March 11, 1950, Serial No. 149,133

1 Claim. (Cl. 56—328)

This invention is directed to, and it is a prime object to provide, a tractor mounted tree shaking mechanism of novel construction and function; the mechanism being especially designed, but not limited, for use to shake walnuts free from trees during the harvest.

Another object of the invention is to provide a tree shaking mechanism mounted on one end of the tractor and including a cable adapted to extend some distance to connection with a large limb of the tree; the tractor being positioned to take the slack out of the cable, and the mechanism then being operative to recurringly impose a tension on the cable and then release such tension with a snap-action whereby to cause forceful and effective shaking of the tree to free the walnuts, or other crop, therefrom.

A further object of the invention is to provide a tree shaking mechanism, as above, which includes a tractor driven disc having one or more drop-off cams in circumferentially spaced relation thereon, and a swingable, roller supporting structure adapted for movement in a direction to dispose the roller in the path of said cams; the cable being anchored at its inner end to such swingable structure, and said cable—when taut—urges the swingable structure in said direction so that the cams successively and recurringly engage and release the roller whereby to correspondingly tension and release the cable.

An additional object of the invention is to provide a tree shaking mechanism which is adapted to mount on the front end of a tractor whereby the cable leading to the tree is in view of the tractor operator, greatly facilitating the operation.

A further object of the invention is to provide a tree shaking mechanism which is designed for ease and economy of manufacture.

Still another object of the invention is to provide a practical and reliable tree shaking mechanism, and one which will be exceedingly effective for the purpose for which it is designed.

These objects are accomplished by means of such structure and relative arrangement of parts as will fully appear by a perusal of the following specification and claim.

Figure 1:
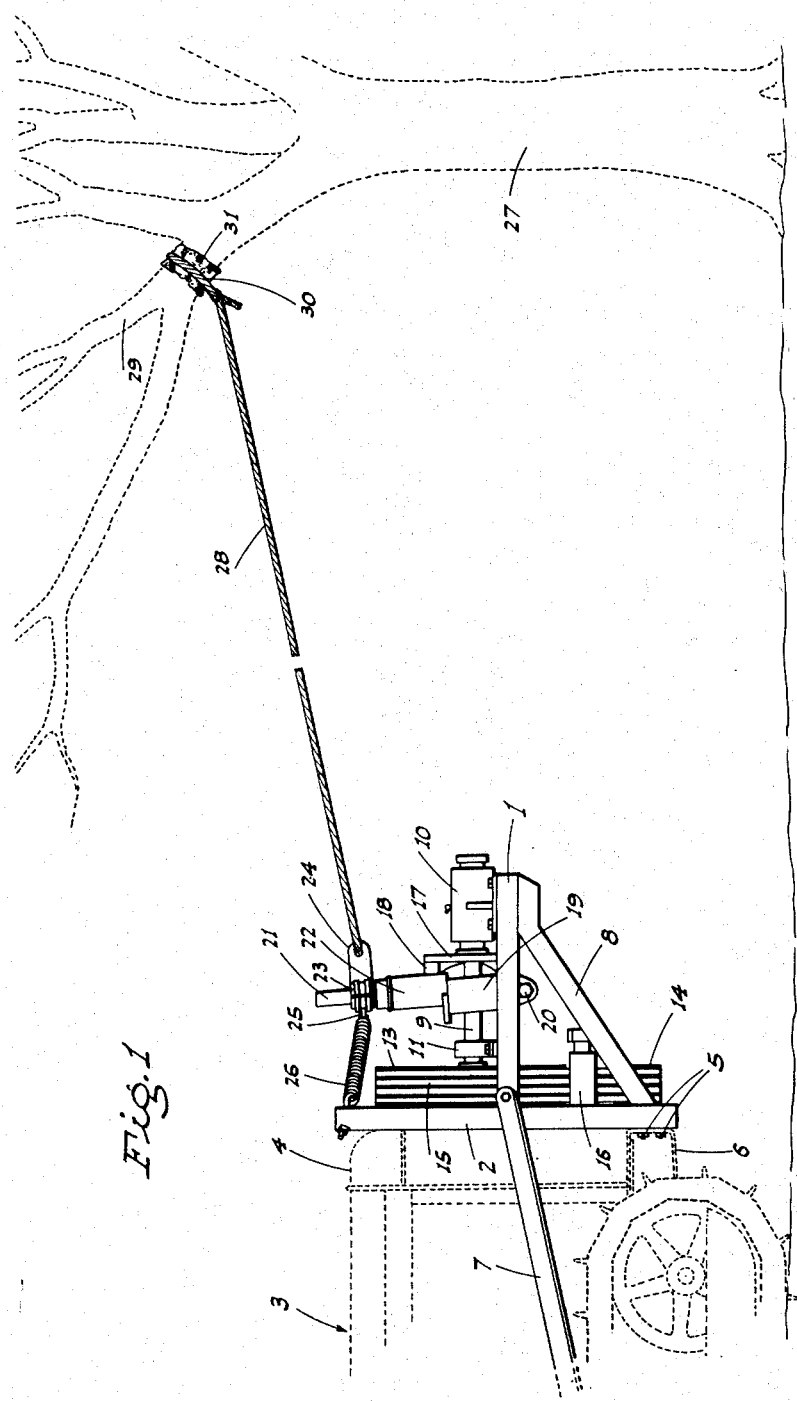
Fig. 1 is a side elevation of the shaking mechanism as mounted on a tractor, and in use.
Figure 2:
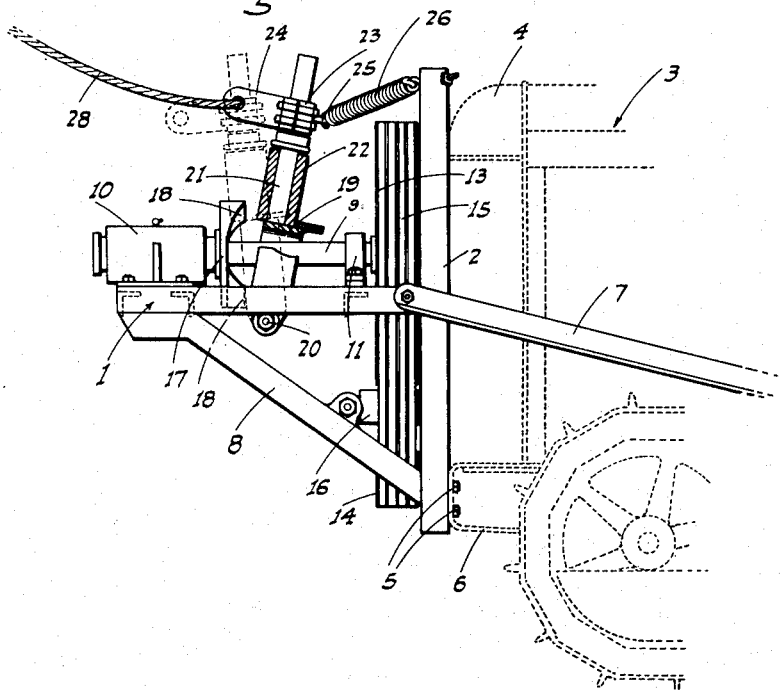
Fig. 2 is an enlarged side elevation, partly in section, of the tree shaking mechanism as mounted on the front end of a tractor.
Figure 3:
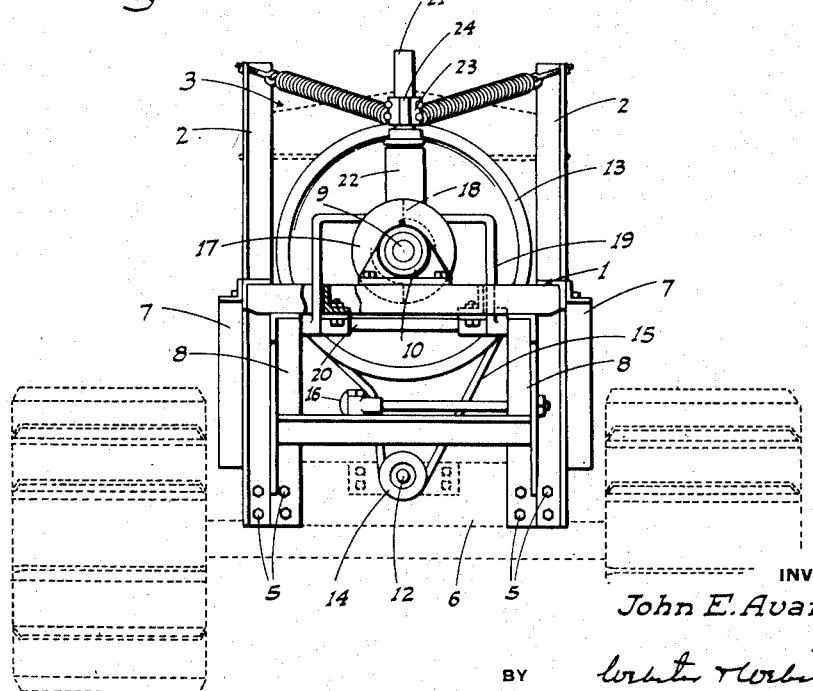
Fig. 3 is a front elevation of said mechanism as mounted on a tractor.

Referring now more particularly to the characters of reference on the drawings, the novel, tree shaking mechanism comprises a horizontal platform 1 which projects in rigid relation from an upstanding frame 2 adapted to be secured to the front end of a tractor, indicated generally at 3, ahead of the radiator shell 4 thereof. The upstanding frame 2 is secured to the tractor by suitable means, such as bolts 5 connected to the tractor frame 6, and side braces 7 which connect between said frame 2 and the tractor frame 6.

The forwardly projecting horizontal platform 1 is stabilized by diagonal braces 8 between such platform and the lower portion of the upstanding frame 2.

A horizontal, longitudinally extending shaft 9 is journaled on the platform 1, being carried in a heavy-duty front bearing 10 and a rear bearing 11. Rearwardly of the bearing 11 the shaft 9 is driven from the tractor engine shaft 12 by an endless belt and pulley assembly which includes a large pulley 13 on the rear end of the shaft 9, a smaller pulley 14 on the engine shaft 12, and multiple V-belts 15 connecting said pulleys. Additionally, the multiple V-belts 15 run over a suitable belt tightener 16.

Adjacent but to the rear of the front bearing 10 the shaft 9 is fitted with a heavy-duty disc 17, and on its rear face said disc is formed, at opposite points, with drop-off cams 18.

Between the disc 17 and the rear bearing 11 the mechanism includes a swingable yoke 19, of generally inverted U-shape, pivoted at its lower end, as at 20, to opposite sides of the horizontal platform 1 for swinging in a longitudinal vertical plane; i. e., forwardly toward the disc 17 or rearwardly away therefrom.

The swingable yoke 19 is fitted, on top, and centrally of its ends, with a rigid, upstanding spindle 21, and a heavy-duty roller 22 surrounds the lower portion of said spindle.

Above the roller 22 the upstanding spindle 21 is fitted with a clamped-on collar 23 having an eyed cable attachment tongue 24 projecting forwardly therefrom. At the rear the collar 23 is formed with eyes 25, and a pair of rearwardly diverging, normally loaded tension springs 26 are connected between said eyes 25 and the top corners of the upstanding frame 2; the purpose of such springs 26 being to normally swing the spindle 21 and yoke 19 rearwardly so as to clear the roller 22 from the path of rotation of the drop-off cams 18.

When the above described tree shaking mechanism is in use, the tractor is positioned in facing relation to the tree 27 which is to be shaken, and a flexible cable 28 is connected to the tongue 24 and leads to the tree; the free end of said cable being attached to one of the largest tree limbs 29 by means of a hook or attachment loop 30 having padding 31 between the same and said limb.

After attachment of the cable 28, as above, the operator backs the tractor 3 until said cable is taut, causing the yoke 19 and spindle 21 to swing forward against the tension of springs 26 until the roller 22 is disposed in the path of the cams 18.

When this occurs the roller 22 alternately and recurringly relatively rides the cams 18 and then drops off the same; the result being that the cable 28 is forcefully tensioned and then instantaneously released time and time again. This action causes a very forceful and effective vibration or shaking of the tree, and such shaking frees the nut or other crop, which then fall upon the ground for subsequent recovery.

After each tree shaking operation the tractor 3 is advanced, whereupon the springs 26 immediately pull back on the spindle 21 to relieve the roller 22 from the cams 18, whereupon operation of the mechanism ceases, permitting the cable 28 to be readily detached from the tree limb.

While the mechanism is relatively simple in its structure, it is sturdy and functions most effectively to the accomplishment of the desired end; thus providing a very practical and reliable device for the purpose.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a tractor mounted tree shaking attachment, a constantly driven horizontal-axis rotary disc mounted beyond an end of the tractor, and whose axis extends lengthwise of the tractor, a cam on said disc facing the tractor, a swing yoke, means pivoting the yoke at its lower end on the attachment transversely of the disc axis and between the tractor and the disc, an element on the yoke for intermittent engagement by the cam to swing the yoke toward said end of the tractor, a member on the upper end of the yoke above the disc for connection to a tree-attached cable, and a spring between the attachment and yoke acting on said yoke to normally hold the yoke element clear of the cam whereby when the yoke is freed from tree tension, the disc may continue to rotate without the cam contacting said element.

JOHN E. AVANSINO.

References Cited in the file of this patent
UNITED STATES PATENTS

| Number | Name | Date |
| --- | --- | --- |
| 502,828 | Patten | Aug. 8, 1893 |
| 819,649 | Ham | May 1, 1906 |
| 1,306,821 | Kohlhaas | June 17, 1919 |
| 2,159,311 | Berger | May 23, 1939 |
| 2,465,028 | McNaughton | Mar. 22, 1949 |
| 2,503,990 | Balsbaugh | Apr. 11, 1950 |
| 2,568,193 | Johnson | Sept. 18, 1951 |

OTHER REFERENCES

Diamond Walnut News, November 1948, page 10.